Jan. 26, 1943. G. A. LYON 2,309,519
WHEEL STRUCTURE
Filed Sept. 29, 1941
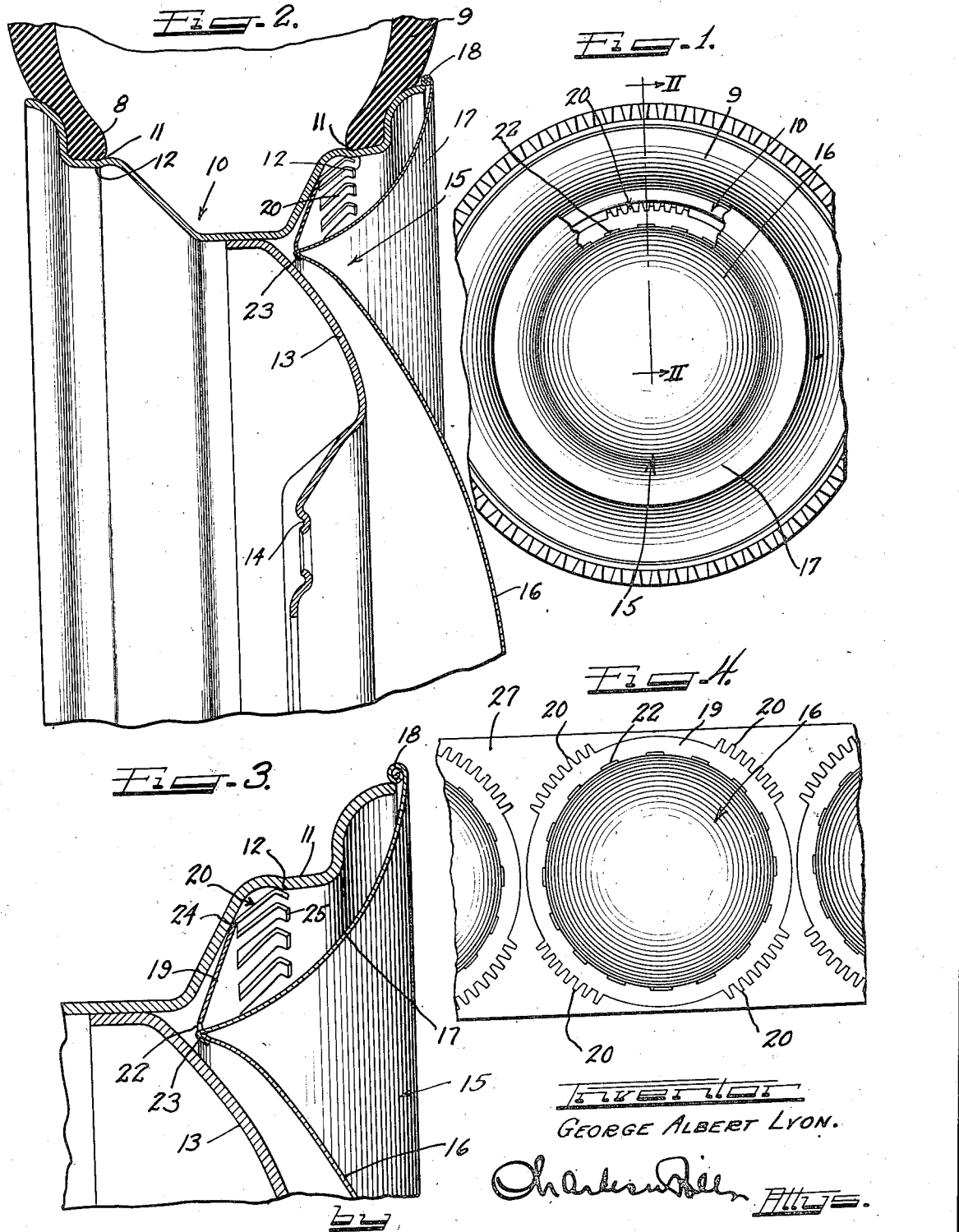
Inventor
GEORGE ALBERT LYON.

Patented Jan. 26, 1943

2,309,519

UNITED STATES PATENT OFFICE 2,309,519

WHEEL STRUCTURE

George Albert Lyon, Allenhurst, N. J.

Application September 29, 1941, Serial No. 412,755

4 Claims. (Cl. 301—37)

This invention relates to a wheel structure, and more particularly to a novel wheel cover therefor.

An object of this invention is to provide a multipart tire cover including an outer trim ring and a central circular part interlocked together in a novel way and in such a manner that the trim ring conceals the retaining means for the cover.

Another object of this invention is to provide a novel wheel cover wherein an outer ring-like part may be separately finished from a central part and thereafter attached economically to the central part in such a way as to provide a desirable appearance in which the ring is contrasted against the central part of the cover.

A further object of the invention is to provide a novel and simplified way of retaining a wheel cover on a wheel.

In accordance with the general features of this invention, there is provided in a wheel structure including a wheel having a body part and a drop center tire rim provided with a tire bead retaining depressed section which, in turn, provides a lateral hump on the flange of the rim part and a wheel cover comprising a central circular part having a plurality of spaced cover retaining fingers on its outer margin for cooperation with the hump on the rim of the wheel and also having a trim ring disposed over the fingers for concealing the same when the cover is on the wheel and attached in a unique way to the central circular part.

In accordance with other features of this invention, there is provided a novel attachment between a trim ring and a central cover part which attachment comprises tangs or extensions on an inner edge of the trim ring extending through slots in a marginal portion of the central part and locked against the back surface of the central part adjacent the junction of that part with its retaining means.

A still further feature of the invention relates to the formation of the retaining means or fingers on the central cover part from the four corners of a blank from which the part may be made whereby the fingers utilize what would be normally waste material and are formed integral with the central cover part, thus eliminating the necessity of any finger attaching operations.

Another feature of the invention relates to the arrangement and configuration of the trim ring and central body part so that the curved convex surfaces of these parts are opposite each other and may reflect the light from each other to give an enhanced overall appearance to the wheel cover.

Other objects and features of this invention will more fully appear from the following detailed description taken in connection with the accompanying drawing which illustrates a single embodiment thereof, and in which:

Figure 1 is a fragmentary side elevation of a wheel and tire provided with a cover of my invention, the cover being partly broken away to show the retaining fingers;

Figure 2 is an enlarged fragmentary cross sectional view taken on the line II—II of Figure 1 looking in the direction indicated by the arrows and showing the manner in which the parts of the wheel cover cooperate with the wheel, as well as the manner in which the retaining fingers co-act with the rim part of the wheel to hold the cover on the wheel;

Figure 3 is an enlarged fragmentary cross sectional view corresponding to the upper right hand portion of Figure 2; and Figure 4 is a fragmentary view of a sheet of material showing how the central cover part of my novel wheel cover may be blanked therefrom in such a manner as to utilize what is normally waste material in the formation of the cover retaining fingers on the central cover part.

As shown on the drawing:

The reference character 10 designates generally a conventional drop center type of tire rim of an automobile wheel. This rim 10 is adapted to carry a tire 9 having the usual beads 8 which are disposed in depressed sections 11 in side flanges of the multi-flange rim 10. Each of these depressed tire bead retaining sections 11 provides an external annular hump 12, the outermost one of which I utilize in the retention of my wheel cover on the wheel. It should be noted, as is now well known in the art, that these depressed sections 11 serve to hold the tire bead 8 in place in the event of rupture or deflation of the tire.

The rim part 10 is attached at its base flange to the usual central wheel body part or spider 13 which is provided with the usual central bolt-on flange 14.

In accordance with the features of my invention, there is provided a circular wheel cover 15 which is made of a multiple of sheet metal parts, namely, a central circular wheel part 16 and an outer annular part or trim ring 17. Both of these parts may be made from any suitable sheet material, such, for example, as metal or steel sheet, and may be economically fabricated in conventional punch press equipment.

Each of the two cover parts 16 and 17 is of a concavo-convex, curved cross-sectional shape, and the convex outer surfaces of these two parts are disposed opposite to each other, so that they may reflect light one from the other. For illustration, if the part 16 has its outer surface finished with a chrome or lustrous appearance, it will reflect the color of the outer surface of the part 17. Moreover, due to the fact that the part 17 extends clear out to the side wall of the tire 9, as shown in Figure 2, when this part is given an egg-shell white finish, it provides the tire with the appearance of having a white side wall which extends clear up to the chrome or lustrous finished central or hub part 16. In this respect, it should be noted that the outer margin of the trim ring 17 is provided with a turned or rolled outer edge 18 which overhangs the edge of the corresponding opposite flange of the rim 10 and is disposed in close proximity to the side wall of the tire. I purposely reinforce this outer edge 18 so that a pry-off tool may be inserted thereunder for the purpose of ejecting the wheel cover from the wheel when it is desired to remove the same so as to have access to the usual central bolts employed for fastening the bolt flange 14 in place on the axle of a wheel.

In Figure 4, I have illustrated somewhat diagrammatically how the central wheel part 16 may be fabricated from sheet or strip steel. In the fabrication of these parts, they are punched by suitable press equipment from continuous sheet stock 27, and each of them in addition to including a dome-like center also includes a marginal portion or flange 19, which has at four spaced sections or points a plurality of groups of fingers 20. These fingers are arranged in four groups and correspond to four corners of what would be a square. In other words, I am enabled, by forming the fingers at the same time as I form the body of the part 16, to utilize what would normally be waste material between the parts in the sheet strip 27. This enables a more economical process of manufacturing the central part of the cover, as well as eliminates the necessity of using any attaching means for securing retaining fingers to the cover, since the fingers are already formed integral with the central body part.

It will, of course, be appreciated that after the formation of the part 16 with its flange 19 and fingers 20 the flange must be inclined as shown in Figure 3, and the fingers must be bent to the shape shown in Figure 3. This work may likewise all be performed by suitable press equipment.

It will further be perceived that the part 16 at its junction with the outer marginal flange 19 is provided with a plurality of slots or openings 22 which are utilized in the fastening of the trim ring part 17 to the part 16. This attachment is effected by providing the inner edge of the trim ring 17 with a plurality of tangs 23 which are inserted through the slots or openings 22 and are bent radially inwardly under the rear surface of the part 16 so as to lock the trim ring 17 to the part 16 and thus provide a unitary structure. When the trim ring 17 is thus locked to the part 16, it serves to conceal the flange 19 and the fingers 20, as well as the point of engagement between the fingers and the hump 12.

The fingers 20 are inclined radially and axially outwardly, and each terminates in a turned end or extremity 25 which is slightly inclined so as to be easily cammed over the hump 12.

In the application of the cover to the wheel, it is pressed over the outer side of the wheel and then is forced home into a snap-on retained engagement with the rim of the wheel. During this attaching operation, the fingers 20 are cammed from their normal shape as they pass over the hump 12 and spring slightly outwardly but not fully back to their normal position, so that they are under tension when in cover retaining cooperation with the annular hump 12. This construction is such that the wheel cover goes on easily but is somewhat more difficult to remove and necessitates the use of a pry-off tool to forcibly eject it from its resiliently retained engagement with the wheel.

Attention is also directed to the fact that the flange 19 at its junction with the fingers 20 is adapted to bear against a side flange of the rim as indicated at 24 in Figure 3 and thus provide a backing for the fingers. This results in the fingers in reality being wedged between the hump 12 and the point 24 on the side flange of the wheel rim.

I claim as my invention:

1. As an article of manufacture, a circular wheel cover comprising a central circular part having a plurality of spaced cover retaining fingers on its outer margin for cooperation with a part of a wheel and a trim ring disposed over said fingers for concealing the same when the cover is on the wheel and attached to a portion of said central part adjacent its junction with said fingers, said trim ring being arranged to conceal a side flange of a tire rim of the wheel, said attachment comprising tangs on an inner edge of said trim ring extending through slots in a marginal portion of said central part and locked against the back surface of said central part.

2. In a wheel structure including a tire rim and a body part, a circular wheel cover member comprising a central circular part having a plurality of spaced cover retaining fingers on its outer margin for cooperation with said body part of the wheel and a trim ring member disposed over said fingers for concealing the same when the cover is on the wheel and attached to a portion of said central part adjacent its junction with said fingers, said trim ring member being arranged to conceal a side flange of said tire rim of the wheel, said attachment comprising tangs on one of said members extending through slots in a marginal portion of the other member and locked against a surface thereof said fingers being concentric with the points of attachment of said tangs but being disposed radially outwardly of said attachment.

3. In a wheel structure including a wheel having a body part and a drop center tire rim provided with a tire bead retaining depressed section providing an external hump on a flange of the rim part, a wheel cover comprising a central circular part having a plurality of spaced cover retaining fingers on its outer margin inclined at an angle to be resiliently snapped over and behind said hump, and a trim ring disposed over said fingers for concealing the same when the cover is on the wheel and attached to a portion of said central part adjacent its junction with said fingers, said attachment comprising extensions on said trim ring projecting through slots in the marginal portion of said central part and turned back under said central part to lock the ring thereto.

4. In a wheel structure including a wheel having a body part and a drop center tire rim provided with a tire bead retaining depressed section providing an external hump on a flange of the rim part, a wheel cover comprising a central circular part having a plurality of spaced cover retaining fingers on its outer margin inclined at an angle to be resiliently snapped over and behind said hump, and a trim ring disposed over said fingers for concealing the same when the cover is on the wheel and attached to a portion of said central part adjacent its junction with said fingers, said attachment comprising extensions on said trim ring projecting through slots in the marginal portion of said central part and turned back under said central part to lock the ring thereto, said attachment being adjacent the junction of said rim and body parts and radially inwardly of said hump with said fingers inclined radially and axially outwardly each with a turned end flexible under tension into retaining engagement behind the hump on the rim of the wheel.

GEORGE ALBERT LYON.